UNITED STATES PATENT OFFICE 2,564,911

SEPARATION PROCESS

Julian M. Mavity, Hinsdale, Ill., assignor to Universal Oil Products Company, Chicago, Ill., a corporation of Delaware No Drawing. Application June 10, 1950,
Serial No. 167,479

9 Claims. (Cl. 260—613)

This invention relates to a separation process and more particularly to a novel method of separating the effluent products resulting in a process for the conversion of hydroquinone.

Hydroquinone serves as a source material for the preparation of various substituted hydroquinone products, including p-alkoxyphenols, dialkoxybenzenes, amino substituted alkoxybenzenes, etc. During the conversion reaction there is formed a hydroquinone-tar fraction, from which it is difficult to separate the hydroquinone for further utilization. A typical process in which this occurs is in the reaction of hydroquinone with an alcohol and/or dialkyl ether to form an alkoxyphenol. The effluent products from this reaction include a hydroquinone-tar fraction and, as will be shown by the following examples, considerable difficulty is encountered in the separation of hydroquinone from this fraction. The present invention is directed to a novel method of effecting this separation.

In one embodiment the present invention relates to a method of treating a hydroquinone-tar fraction which comprises commingling water and dimethoxybenzene with said fraction to form an aqueous hydroquinone phase and a tar-dimethoxybenzene phase, and separately withdrawing each phase.

In a specific embodiment the present invention relates to the process which comprises reacting hydroquinone with a reagent selected from methanol and dimethyl ether to form primarily p-methoxyphenol and at the same time forming a hydroquinone-tar fraction, separating said hydroquinone-tar fraction from the other effluent products, commingling water and p-dimethoxybenzene with said fraction to form an aqueous hydroquinone phase and a tar-dimethoxybenzene phase, separately withdrawing each phase, and recycling the hydroquinone for conversion as aforesaid.

The reaction of hydroquinone with an alcohol and/or dialkyl ether is effected at a temperature of from about 350° to about 700° F. and a pressure of from atmospheric to 1000 pounds or more per square inch in the presence of a suitable catalyst. Preferably, a molar excess of alcohol and/or dialkyl ether is utilized which may range from about 1 to 20 mols or more of alcohol per mol of hydroquinone or from about 0.5 to 10 mols or more of dialkyl ether per mol of hydroquinone.

The etherification process may be utilized for the manufacture of a p-alkoxyphenol. When p-methoxyphenol is desired, hydroquinone is reacted with methyl alcohol and/or dimethyl ether. When other alkoxyphenols are desired, the corresponding alcohol and/or dialkyl ether is employed. Other alcohols include ethanol, propanol, butanol, pentanol, etc. Other dialkyl ethers include diethyl ether, dipropyl ether, dibutyl ether, diamyl ether, etc. and, where mixed alkoxyphenols are desired, alkyl ethers having different alkyl groups may be employed such as methyl ethyl ether, methyl propyl ether, methyl butyl ether, methyl amyl ether, ethyl propyl ether, ethyl butyl ether, ethyl amyl ether, propyl butyl ether, propyl amyl ether, butyl amyl ether, etc.

A particularly preferred catalyst for this reaction comprises a composite or association of silica and alumina, prepared either synthetically or naturally occurring. Of the naturally occurring catalysts, acid treated clays such as Filtrol, Tonsil, etc. are preferred. Other catalysts comprise solid dehydrating catalysts including the oxides of aluminum, thorium, tungsten, titanium, zirconium, molybdenum, chromium, etc. either alone or together with the oxides of aluminum, magnesium and zinc, potassium carbonate, etc. It is understood that these catalysts are not necessarily equivalent in their activity but that all of them are effective to catalyze the reaction.

The reaction may be effected in any suitable process equipment. A particularly preferred method comprises a fixed bed type of operation in which the catalyst is disposed in a reaction zone and the reactants are passed therethrough in either upward or downward flow. Other suitable methods include reaction zones containing trays on which the catalyst is disposed and the trays being so positioned that the reactants follow a circuitous route in passing through the reaction zone. Another method of operation may be the fluidized type process in which the catalyst is introduced into the reaction zone by means of all or a portion of the reactants or another suitable carrier and the flow rate is regulated to maintain the catalyst in a turbulent mass under hindered settling conditions.

Another preferred method of operation comprises the suspensoid type of operation in which the catalyst in finely divided form is commingled with a suitable carrying medium and the resultant suspension or emulsion is continuously introduced into the reaction zone. In one method, the catalyst may be suspended in one or all of the reactants and, in another method, the catalyst may be suspended in a suitable carrier which may be a viscous hydrocarbon oil which preferably boils above the range of methoxyphenol so that the methoxyphenol may be readily separated from the higher boiling oil. Suitable oils include Nujol, lubricating oil, high boiling gas oil fractions, other predominantly non-aromatic oils, etc. The desired methoxyphenol may be separated from the oil and the oil containing the catalyst may be recycled. When desired, other by-products may be separated from the oil before the latter is recycled. When the catalyst becomes inactive, it may be separated from the oil and either regenerated and recycled or disposed of as desired. This method has the advantage over the fixed bed type of operation in not requiring discontinuance of operation in order to remove the catalyst after it has become inactive for the purpose.

In the reaction of hydroquinone with dimethyl ether and/or methanol, the reaction effluent products will comprise dimethyl ether, methanol, water, dimethoxybenzene, hydroxyanisole, hydroquinone and tar. These products may be separated in any suitable manner such as solvent extraction, fractionation, etc. By means of a series of successive fractionation steps all of the effluent products may be separated from a hydroquinone-tar fraction. The hydroquinone-tar fraction cannot readily be further separated by ordinary fractionation methods. Similarly, difficulty is encountered in endeavoring to effect separation by ordering solvent extraction methods. As will be shown by the following examples, a number of solvents were tried for this purpose and they were found to have certain disadvantages. However, it has been found that p-dimethoxybenzene with water is unique in that it readily effects a separation of an aqueous hydroquinone phase from a tar-dimethoxybenzene phase. Another advantage to the use of p-dimethoxybenzene for this purpose is that p-dimethoxybenzene is formed as a by-product in the process and, therefore, is readily available. The proportions of dimethoxybenzene to be utilized in effecting this separation will depend upon the particular hydroquinone-tar fraction to be treated but in general will be within the range of from about 0.1 to about 2 parts by weight of dimethoxybenzene per 1 part by weight of hydroquinone-tar fraction. It is understood that a higher concentration of dimethoxybenzene may be utilized particularly in a counter-current flow type process.

As hereinbefore set forth, this separation is effected in the presence of water. The amount of water to be used will vary considerably but generally will be within the range of from about 0.25 to 25 or more parts of water per part of hydroquinone-tar fraction. More water will generally be utilized in a continuous type process than in a batch type. The water may be separated from the hydroquinone by distillation and the water recycled within the process if desired.

The separation may be effected at any suitable temperature above the melting point of p-dimethoxybenzene which is approximately 133° F. The hydroquinone-tar fraction is a viscous fluid or a solid at this temperature and, therefore, it generally is desirable to utilize a higher temperature which may range up to 350° F. or more. The hydroquinone-tar fraction becomes more fluid as the temperature is increased. Due to the presence of the other components in the mixture, the hydroquinone will not undergo substantial decomposition at the higher temperature which is contrary to what was observed when heating substantially pure hydroquinone. Pressure may be utilized when desired, particularly in continuous type operation process.

The separation may be effected in either continuous or batch type of operations. A particularly suitable continuous operation comprises the use of a series of settling zones containing baffles or the like, with suitable mixing devices interposed between zones. The hydroquinone-tar fraction is introduced at one end of the process and the dimethoxybenzene is introduced at the other end of the process, and the two streams are passed countercurrently to each other. Another continuous type of operation comprises the use of a large zone containing solid packing material, bubble decks, trays, side to side pans, or the like, and the hydroquinone-tar fraction is introduced at a mid-point thereof while the dimethoxybenzene and water are introduced at the opposite ends thereof. In the batch type operation the hydroquinone-tar fraction and the dimethoxybenzene are introduced into a vessel, the contents intimately stirred and allowed to settle into two phases. The charge may be heated all or in part before being introduced into the contacting zone and/or the contacting zone heated as desired.

The hydroquinone recovered in the above manner is preferably recycled to the etherification process for conversion therein. The tar-dimethoxybenzene phase may be discarded but preferably is subjected to suitable treatment for recovery of the dimethoxybenzene for future use. This separation may be effected by steam distillation, vacuum distillation, etc. or by extraction with a hydrocarbon or other suitable solvent.

The following examples are introduced to illustrate further the novelty and utility of the present invention but not with the intention of unduly limiting the same.

Example I

Hydroquinone was reacted with dimethyl ether in a series of runs at temperatures varying from 393° to 500° F. and pressures varying from 200 to 1000 pounds per square inch in the presence of a synthetically prepared silica-alumina catalyst containing about 10% by weight of alumina. From the products of this reaction, dimethyl ether, methanol and water were separated, and the resultant residue was subjected to fractination under vacuum to take overhead p-dimethoxybenzene and p-methoxyphenol and to leave a hydroquinone-tar fraction.

The following run was made in a batch type operation wherein 21.917 gms. of the tar-hydroquinone fraction, 10.46 gms. of p-dimethoxybenzene and 22 gms. of water were charged to a separation zone. The contacting was effected at a temperature of about 190° F. and the mixture was thoroughly stirred and allowed to settle. The mixture separated into a clear aqueous hydroquinone phase and a tar-dimethoxybenzene phase. The aqueous phase was withdrawn, 22 gms. of water additionally added and the operation repeated. After the mixture had settled, the aqueous phase was withdrawn, and 22 gms. of water again charged and the operation repeated. When the mixture settled, the aqueous phase was withdrawn. In all stages there was clear separation of two phases.

From this operation there was recovered a total aqueous phase of 75.4 gms. The aqueous phase was distilled to remove water and to leave a total of 14.829 gms. (67.7 weight per cent) of a hydroquinone fraction containing 87% hydroquinone. Infra-red analysis showed that the hydroquinone-tar fraction contained 70% hydroquinone. It is thus seen that the process of the present invention resulted in a recovery of approximately 84% of hydroquinine.

*Example II*

In an attempt to use water as a solvent for recovering hydroquinone from the hydroquinone-tar fraction, a run similar to that described in Example I was made omitting the p-dimethoxybenzene. This run resulted in a mixture having a muddy appearance so that it was difficult to locate the interface between the two phases. However, a hydroquinone fraction recovered with difficulty in this process had a hydroquinone content which averaged 77% hydroquinone.

It is thus seen that the use of dimethoxybenzene results in a clear separation of the two phases and also in a hydroquinone fraction of higher purity.

*Example III*

As hereinbefore set forth the use of other solvents for this purpose proved unsatisfactory. A C₈ aliphatic hydrocarbon fraction and a xylene fraction were each tried for this purpose in conjunction with water and proved of no value because they resulted in the formation of a third liquid phase.

*Example IV*

Phenol, anisole, diphenyl and diphenyl ether were each separately tried as solvents for this separation in conjunction with water but in all cases they were unsatisfactory because there was no clear separation of an aqueous phase. From the above examples it is apparent that p-dimethoxybenzene is particularly suitable as a solvent for the separation of hydroquinone from a hydroquinone-tar fraction.

I claim as my invention:

1. A method of treating a hydroquinone-tar fraction which comprises commingling water and dimethoxy-benzene with said fraction to form an aqueous hydroquinone phase and a tar-dimethoxybenzene phase, and separately withdrawing each phase.

2. A method of treating a hydroquinone-tar fraction formed during the reaction of hydroquinone, which comprises commingling water and dimethoxybenzene with said fraction to form an aqueous hydroquinone phase and a tar-dimethoxybenzene phase, and separately withdrawing each phase.

3. A method of separating hydroquinone from a hydroquinone-tar fraction formed in the reaction of hydroquinone with a reagent selected from a dialkyl ether and an alcohol, which comprises commingling water and dimethoxybenzene with said fraction to form an aqueous hydroquinone phase and a tar-dimethoxybenzene phase, and separately withdrawing each phase.

4. The process which comprises reacting hydroquinone with a reagent selected from a dialkyl ether and an alcohol to form a p-alkoxyphenol and at the same time forming a hydroquinone-tar fraction, separating said hydroquinone-tar fraction from the other effluent products, commingling water and dimethoxybenzene with said fraction to form an aqueous hydroquinone phase and a tar-dimethoxybenzene phase, separately withdrawing each phase, and recycling the hydroquinone for conversion as aforesaid.

5. The process which comprises reacting hydroquinone with dimethyl ether to form p-methoxyphenol and at the same time forming a hydroquinone-tar fraction, separating said hydroquinone-tar fraction from the other effluent products, treating said hydroquinone-tar fraction with water and p-dimethoxybenzene at a temperature of from about 140° to about 350° F. to form an aqueous hydroquinone phase and a tar-dimethoxybenzene phase, separately withdrawing each phase, removing water from said hydroquinone phase and recycling the hydroquinone for conversion as aforesaid.

6. The process which comprises reacting hydroquinone with methanol to form p-methoxyphenol and at the same time forming a hydroquinone-tar fraction, separating said hydroquinone-tar fraction from the other effluent products, treating said hydroquinone-tar fraction with water and p-dimethoxybenzene at a temperature of from about 140° to about 350° F. to form an aqueous hydroquinone phase and a tar-dimethoxybenzene phase, separately withdrawing each phase, removing water from said hydroquinone phase and recycling the hydroquinone for conversion as aforesaid.

7. A method of treating a hydroquinone-tar fraction which comprises introducing said fraction at a midpoint of a separation zone, introducing p-dimethoxybenzene at an upper point of said separation zone, introducing water at a lower point of said separation zone, effecting contacting therein at a temperature of from about 140° to about 350° F., withdrawing an aqueous hydroquinone phase from the top of said separation zone, and withdrawing a tar-dimethoxybenzene phase from the bottom of said separation zone.

8. A method of treating a hydroquinone-tar fraction which comprises introducing said fraction to a separation zone, introducing p-dimethoxybenzene at an upper point of said separation zone, introducing water at a lower point of said separation zone, effecting contacting therein at a temperature of from about 140° to about 350° F., withdrawing an aqueous hydroquinone phase from the top of said separation zone, and withdrawing a tar-dimethoxybenzene phase from the bottom of said separation zone.

9. The process which comprises reacting hydroquinone with a reagent selected from a dialkyl ether and an alcohol to form a p-alkoxyphenol and at the same time forming a hydroquinone-tar fraction, separating said hydroquinone-tar fraction from the other effluent products, commingling water and dimethoxybenzene with said fraction to form an aqueous hydroquinone phase and a tar-dimethoxybenzene phase, separately withdrawing each phase, recycling the hydroquinone for conversion as aforesaid, separating dimethoxybenzene from the tar-dimethoxybenzene phase, and reusing said dimethoxybenzene in said process.

JULIAN M. MAVITY.

REFERENCES CITED

The following references are of record in the file of this patent:

UNITED STATES PATENTS

| Number | Name | Date |
|---|---|---|
| 2,067,960 | Werntz | Jan. 19, 1937 |
| 2,459,540 | Rosenwald | Jan. 18, 1949 |